No. 713,597. Patented Nov. 18, 1902.
F. A. BROWNELL.
FOCUSING DEVICE FOR CAMERAS.
(Application filed July 20, 1901.)
(No Model.) 3 Sheets—Sheet 1.

Witnesses.
Walter B. Payne.
G. Willard Rich.

Inventor.
Frank A. Brownell
by Frederick S. Church
his Attorney.

No. 713,597. Patented Nov. 18, 1902.
F. A. BROWNELL.
FOCUSING DEVICE FOR CAMERAS.
(Application filed July 20, 1901.)
(No Model.) 3 Sheets—Sheet 2.
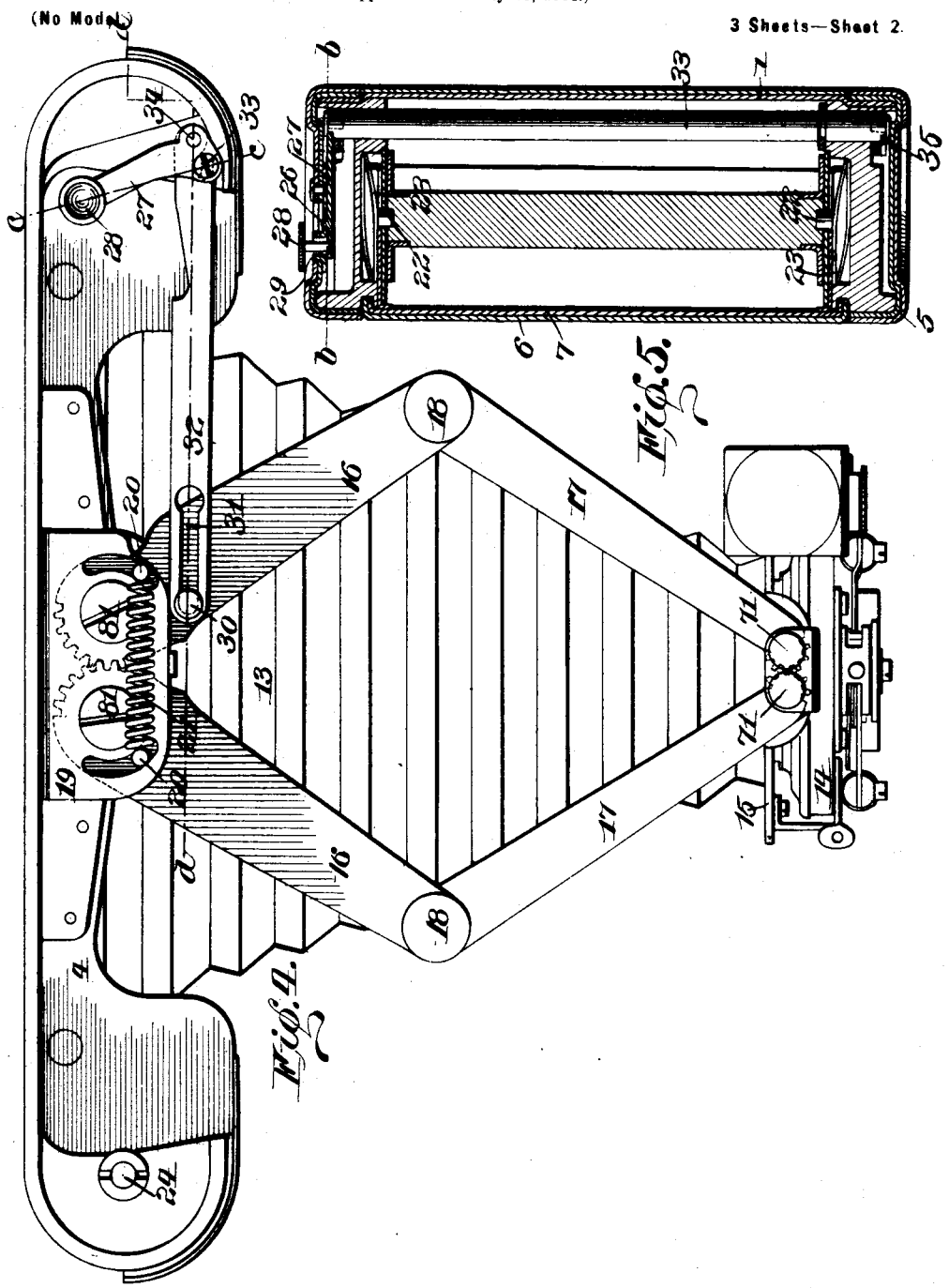
Witnesses.
Walter B. Payne.
G. Willard Rich.
Inventor.
Frank A. Brownell
by Frederick F. Church
his Attorney No. 713,597. Patented Nov. 18, 1902.
F. A. BROWNELL.
FOCUSING DEVICE FOR CAMERAS.
Application filed July 20, 1901.

(No Model.) 3 Sheets—Sheet 3.

Witnesses. Inventor.

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

FOCUSING DEVICE FOR CAMERAS.

SPECIFICATION forming part of Letters Patent No. 713,597, dated November 18, 1902.

Application filed July 20, 1901. Serial No. 69,089. (No model.)

*To all whom it may concern:*

Be it known that I, FRANK A. BROWNELL, of Rochester, in the county of Monroe and State of New York, have invented certain new and useful Improvements in Focusing Devices for Cameras; and I do hereby declare the following to be a full, clear, and exact description of the same, reference being had to the accompanying drawings, forming a part of this specification, and to the reference-numerals marked thereon.

My present invention relates to photographic cameras, and particularly to that class known as "folding" cameras—such, for instance, as shown in my prior patent, No. 610,153, dated August 30, 1898—which is adapted to be folded into a small compass for carrying and to be extended when it is desired to make an exposure, such cameras, as a rule, having a fixed focus-lens adapted for making exposures at distances from five to six feet and upward when the supports for the lens and sensitized material are separated a determinate distance; and it has for its object to provide focusing devices capable of application to cameras of this class, whereby, although the camera may be folded for transportation, as heretofore, sharply-defined photographs may be obtained by varying the distance between the lens and film support to correspond to the distance of the camera from the object, as in the usual focusing operation; and to this end the invention consists in improved means for accomplishing the object and which is applicable to cameras of the general form now in use, and, further, in certain improvements hereinafter fully described, the novel features being pointed out in the claims at the end of this specification.

Figure 1:
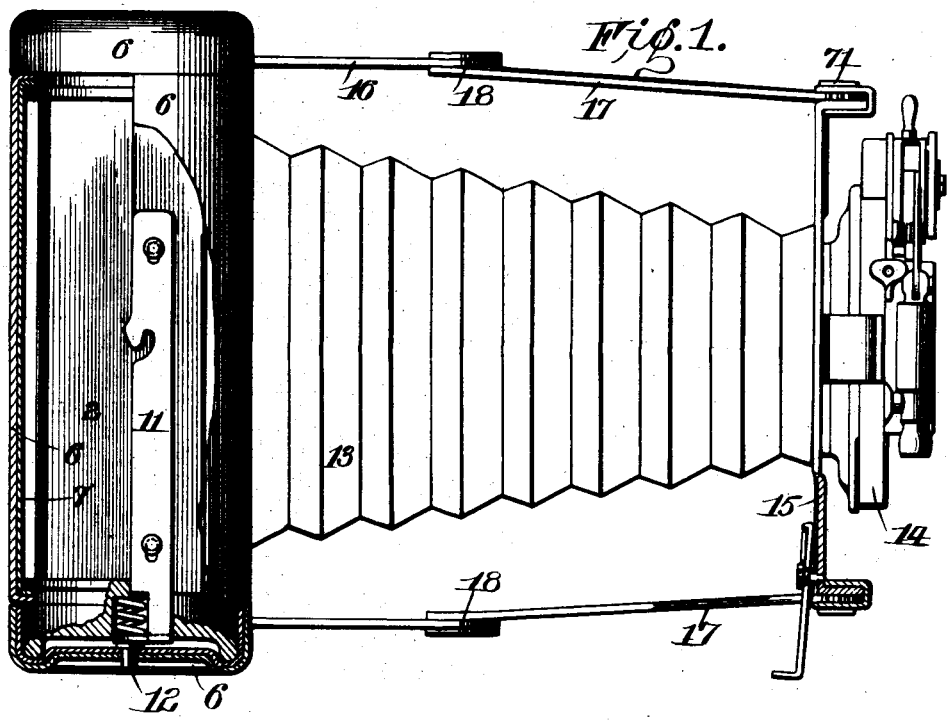
Figure 2:
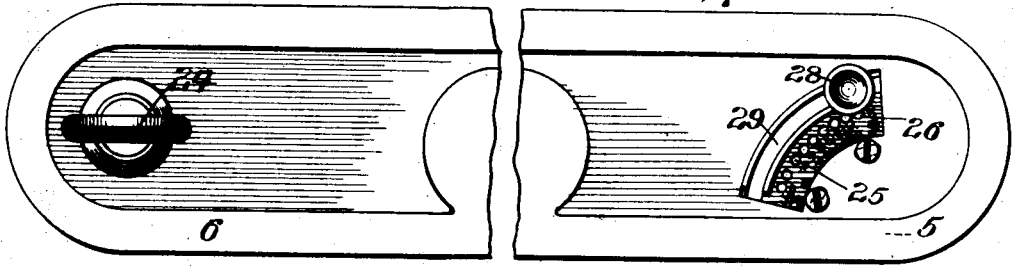
Figure 3:
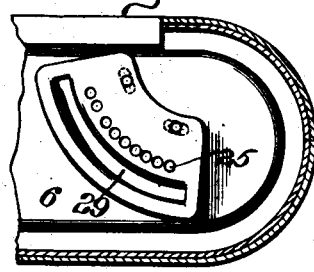
Figure 6:
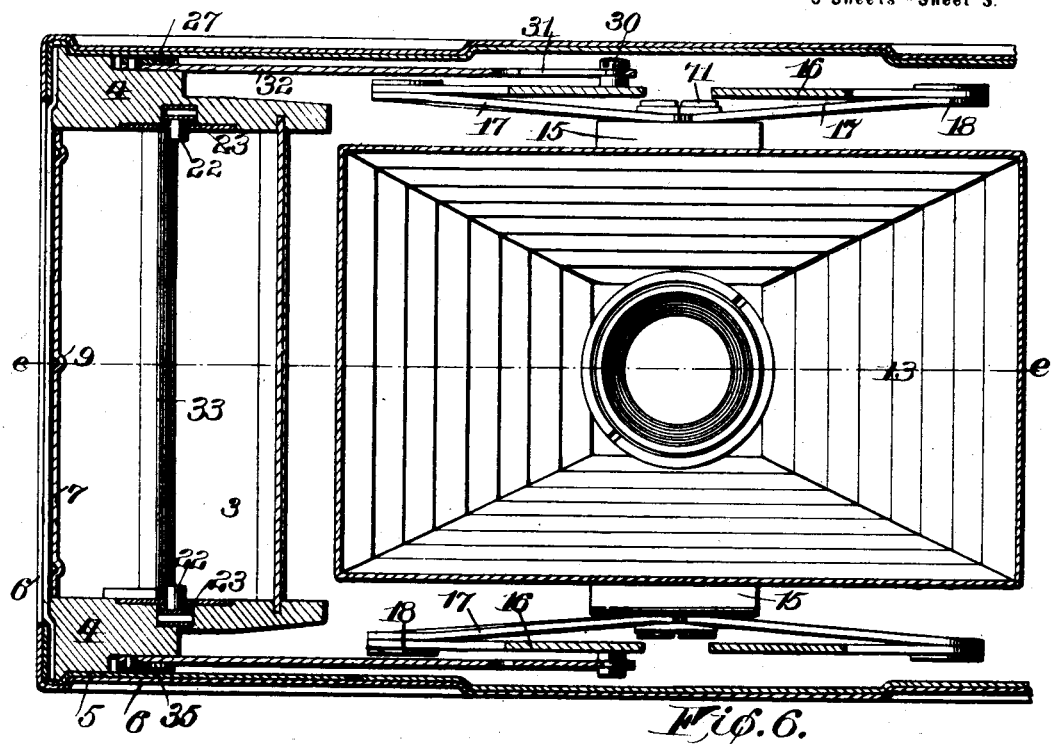
Figure 7:
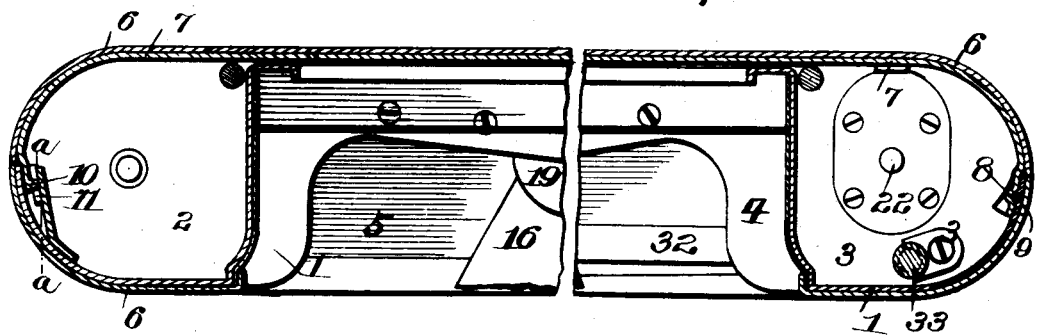

In the accompanying drawings, Figure 1 is a side elevation of a camera embodying my improvements, one side thereof being shown in section or broken away on the line *a a* of Fig. 7 and the central forward support also being shown in section. Fig. 2 is a plan view of a camera embodying my improvements with the camera folded or closed, a portion of the center being broken away to illustrate the construction on an enlarged scale. Fig. 3 is a section taken on the line *b b* of Fig. 5 looking upward; Fig. 4, a plan view of the camera extended, with the top plate of the body or casing removed to show the construction of the parts. Fig. 5 is a vertical sectional view on the line *c c* of Fig. 4; Fig. 6, a vertical sectional view on the line *d d* of Fig. 4, with one end of the camera casing or body removed and looking toward the front; Fig. 7, a horizontal sectional view on the line *e e* of Fig. 6 looking upward and with the bellows and lens support removed.

Similar reference-numerals in the several figures indicate similar parts.

The camera-body is generally the same as that shown in my prior patent referred to, and consists of a front frame constructed, preferably, of sheet metal bent around at the ends to form film-chambers 2 and 3, the former adapted to contain the winding reel or support for the film and the latter the supply-spool. The central portion of this plate 1 is bent rearwardly to form a chamber between the film-chambers and has an opening at the center, over which the film extends when passing from one film-chamber to the other, the rear end of the usual bellows being attached to the edge of this chamber. At the upper and lower ends of the film-chambers are arranged the blocks of closures 4, to which and to the plate 1 are connected the upper and lower covering-plates 5, of sheet metal, covered with the leather cover 6, as usual. The rear of the body or casing is closed by a removable cover-plate 7, also covered with the leather covering 6, said cover-plate having at one end a recess 8, coöperating with a ridge or bead 9 on the front plate of the casing, and the other end is provided with a projection 10, with which coöperates a longitudinally-movable spring-operated catch-plate 11, (shown in Figs. 1 and 7,) said catch-plate being moved to disengage the catch by a button 12, accessible from the lower end of the exterior of the camera-body.

13 indicates the bellows, and 14 the camera-front, containing the lens and attached to a plate or support 15, which, with the bellows, is adapted to be folded within the central chamber between the film-chambers in the body. This plate 15 and the lens-casing are connected to the body by the arms or links 16 and 17, pivoted together at 18, the rear ends of the links 16 being pivoted at 81 in suitable plates or supports 19 at the top and bottom of the camera-body, said arms having intermeshing gear-teeth to insure their simultaneous operation in opposite directions and having also pins 20, to which are connected the ends of a spring 21, serving to draw the arms together to hold the camera-front extended, and when the pins are in rear of the pivot-screws of the arms 16 the camera-front will be held retracted within the central chamber. The outer ends of the links 17 are also pivoted at 71 to the supporting-plate 15 and are provided with intermeshing gear-teeth to insure their simultaneous and equal operation. The links 16 and 17, it will be seen, not only support and carry the lens-support, but are themselves adapted to be folded within the camera-body when the instrument is folded for transportation. Within the film-chambers in the camera-body are mounted spool-centering devices, those in the supply spool-chamber consisting in the present instance of pins 22, secured to or backed by springs 23, and at the upper end of the chamber for the winding-spool is provided a suitable winding-key 24 of the usual or any preferred construction. It will be understood that the focusing of the camera for making exposures at various distances may be accomplished by limiting the forward movement of the lens-support, and in order to regulate this movement, which, as stated, is preferably caused by the spring 21 to a normal distance in the old form of camera, I provide a distance-scale upon the upper portion of the camera-body, as shown in Fig. 2, the markings on said scale being represented in the present instance by apertures 25 in juxtaposition to the figures indicating in feet or meters the distance of the camera from the object to be photographed, and with this scale coöperates an index—in the present instance in the form of the small pin or projection 26—adapted to enter one of the recesses 25, said projection being arranged upon an arm or lever 27, having an operating-handle 28, projecting through a slot 29 in the scale-plate at the top of the camera-body and connected with a suitable stop adapted to limit the relative separation of the lens-support and the camera-body or the support for the sensitized material. In the present embodiment I prefer to limit the movement of the supporting-arms 16, caused by the spring 21, connecting them, and as the supporting-arms are arranged both at the top and bottom of the camera I provide said upper and lower arms each with a pin 30, arranged in slots 31 of links 32, connected to crank-arms on a vertically-extending oscillatory shaft 33, journaled in the upper and lower sides of the camera-body, as shown in Fig. 5, the crank-arm for the upper link 32 being formed integral with the arm or lever 27, to which the upper link 32 is pivoted at 34, the link at the lower end of the camera being pivoted to a small crank-arm 35 at the lower end of the shaft 33. (See Fig. 6.) The shaft, crank-arms, and links are adapted to be secured by the engagement of the pin 26 with the apertures 25 in the index-plate, said arm 27 being of elastic material, so that the projection may be disengaged by pressing down upon the operating handle or button 28, and the lever and links being adjusted the projection 27 is allowed to enter one of the apertures, when it will be secured firmly in position. Inasmuch as the connection between the links 32 and the pins 30 on the arms 16 is a slotted one, the camera-front may be closed into the central chamber without affecting the links or stops, the pins 30 then moving freely outwardly in the slots; but when the camera-front or lens-support is moved outwardly said links will limit its movement and maintain the lens at the proper distance from the film-support as determined by the adjustment of the arm 27. By this means the operator may adjust the arm 27 for taking a picture at any given distance, then draw out the front or lens-support until it is arrested by the stops, and then make his exposure in the usual manner, and if it is desired to change the adjustment or focus while the front is extended it is only necessary to manipulate the operating-handle 27 to obtain the proper focus, the movement of the handle in one direction being controlled by the projecting spring 21.

The feature of providing an adjustable stop for limiting the focusing adjustment in but one direction is advantageous, and particularly so in a camera in which the relative movement of the lens-support and sensitized film-support is caused in one direction by a spring, as it is only necessary for the operator to determine approximately the distance of the object to be photographed and then move the front in one direction as far as it will go or until limited by the stop or stops. Any other form of adjusting-stop which will permit this focusing adjustment may be employed; but I prefer the one shown as applied to the type of camera illustrated in my prior patent.

I claim as my invention—

1. In a camera, the combination with the relatively movable supports for sensitized material and the lens respectively, and means for operating them automatically in one direction, of an adjustable stop for limiting the relative movement of the supports when operated upon by said means.

2. In a camera, the combination of the relatively movable supports for sensitized material and the lens respectively, means for operating them automatically in one direction, and a stop adjustable independently of both for limiting their relative movement when operated upon by said means.

3. In a camera, the combination with the relatively adjustable supports for the lens and sensitized material, of a focusing-stop for limiting the relative movements of the parts in one direction and adjustable independently of either of them to vary their relative position, and means for automatically holding one of the parts in engagement therewith.

4. In a camera, the combination with the relatively adjustable supports for the lens and sensitized material, and a spring for causing their separation, of a focusing-stop adjustable independently of the supports and limiting their movement.

5. In a folding camera embodying a body having film-chambers at the ends and a central chamber between them, a bellows, a lens-support adapted to be folded into the central chamber and supports therefor, of an adjustable focusing-stop for limiting the outward movement of the lens-support.

6. In a camera, the combination with the camera-body, having the central chamber and the film-chamber on opposite sides thereof, the lens-support adapted to fold into the central chamber, the arms connected to the body and lens-support respectively and holding the latter and adapted to fold within the body, of a spring for projecting the lens-support, and an adjustable focusing-stop on the body coöperating with the arms for limiting the outward movement of the lens-support.

7. In a camera, the combination with the body, the lens-support, and the folding arms connecting the two on opposite sides, and adjustable focusing-stops connected for simultaneous operation and coöperating with the arms for limiting the relative separation of the body and lens-support.

8. In a camera, the combination with the camera-body, the lens-support and the folding supporting-arms connecting the two on opposite sides, of an oscillatory shaft having crank-arms thereon and links connected thereto, said links coöperating with the supporting-arms to limit their movement.

9. In a camera, the combination with the camera-body, the lens-support, the folding supporting-arms connecting the two on opposite sides, of the oscillatory shaft, the handle, and holding devices for the latter, crank-arms on the shaft, and the links arranged between the cranks and supporting-arms for limiting the movements of the latter.

10. In a camera, the combination with the camera-body, the lens-support, the arms supporting the latter, one of them provided with a pin, of a pivoted crank-arm, retaining devices therefor and a slotted link connected to the crank-arm and coöperating with the pin on the supporting-arm.

11. In a camera, the combination with the relatively movable body and lens-support, of an adjustable focusing stop-arm, a plate having a plurality of notches and a distance-scale with which said arm coöperates and connections between said arm and the lens-support for arresting the movement of the latter in one direction.

12. In a camera, the combination with the relatively adjustable body and lens-support, of the adjustable yielding pivoted stop-arm having a projection thereon, a scale-plate having apertures therein adapted to receive the projection and connections between said arm and the lens-support for limiting the movement of the latter in one direction.

13. In a folding camera, the support for sensitized material and the relatively movable lens-support, of spring-operated devices for holding the supports in collapsed or extended position and an adjustable focusing-stop for limiting the relative movement of the supports in one direction.

FRANK A. BROWNELL.

Witnesses:
 MAUDE A. BENTLEY,
 G. WILLARD RICH.